Jan. 30, 1968     W. H. DEMARAIS     3,366,413
SAFETY SUN VISOR
Filed Sept. 27, 1965
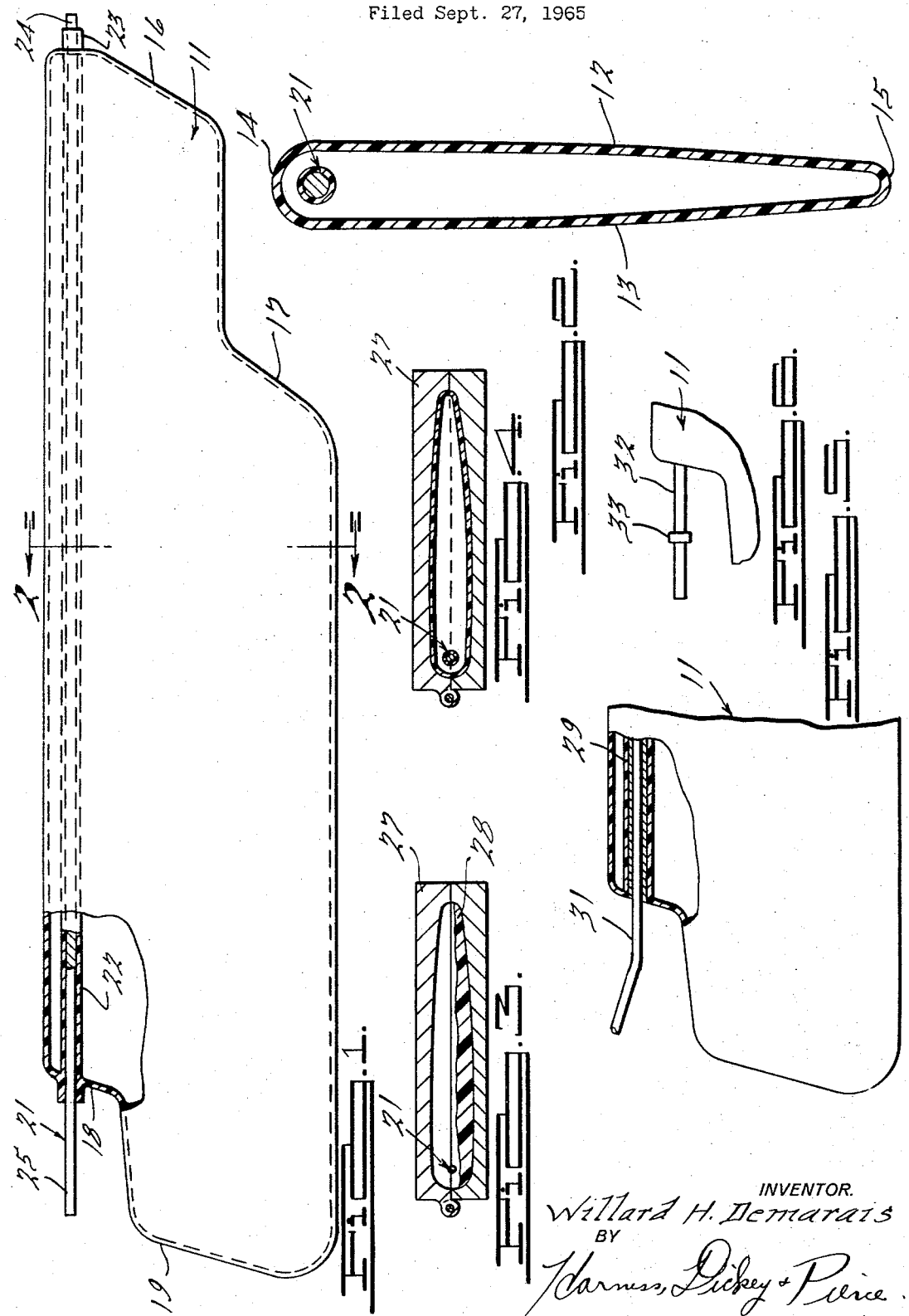
INVENTOR.
Willard H. Demarais
BY
Harness, Dickey & Pierce
ATTORNEYS.

United States Patent Office 3,366,413
Patented Jan. 30, 1968

3,366,413
SAFETY SUN VISOR
Willard Homer Demarais, 20524 Lauder,
Detroit, Mich. 48235
Filed Sept. 27, 1965, Ser. No. 490,588
8 Claims. (Cl. 296—97)

ABSTRACT OF THE DISCLOSURE

The device of the present invention provides safety to the occupants of the front seat of an automotive vehicle as it is made of hollow flexible material which readily deforms by employing a tube spaced from the top, bottom and side walls within the visor and adequate support is provided for the rod extending therethrough which supports the visor permitting all portions of the visor to deflect, since all of the portions thereof are of the same thickness.

This invention relates to visors and particularly to a safety visor for a windshield.

The illustrated visor of the present invention is of notched rectangular form, and it is to be understood that any form of visor may embody the novelty construction of the present invention. The visor is hollow having a soft skin forming the sides and edges supported on a rod, tube or the like. The rod is supported in the end walls spaced from the top edge so that all of the edges are soft except for the small areas in the end walls occupied by the rod. Preferably, the skin material is applied over the rod and sealed to the end walls so that any differential presure may be maintained between the trapped air within the visor and that on the outside thereof.

Accordingly, the main objects of the invention are: to provide a hollow visor having the sides and end walls made from a thin flexible material spaced from the supporting rod which engages the material at the end walls and extends therethrough; to form a visor from a plastisol material in a mold containing the supporting rod by the well known method of agitating the mold while it is heated to evenly distribute a plastisol material thereover while the material is being jelled and fused; to form a plastisol skin on the rod which is spaced from the visor walls and sealed thereto; to provide a safety visor for a windshield having thin flexible walls and a hollow interior supported on a rod which is spaced from the walls, and in general, to provide a hollow safety visor which is simple in construction, which has soft thin walls and which is economical to manufacture.

Other objects and features and novelty of the invention will be specifically pointed out or will become apparent when referring, for a better understanding of the invention, to the following description in conjunction with the accompanying drawing, wherein:

FIGURE 1 is a broken view in elevation of a safety visor embodying features of the present invention;

FIG. 2 is an enlarged sectional view of the structure illustrated in FIG. 1, taken on the line 2—2 thereof;

FIG. 3 is a view of a closed mold with the plastisol material in the lower half thereof;

FIG. 4 is a view of the structure illustrated in FIG. 3 after the plasticized material has been fused on the wall of the mold and about the rod extending therethrough;

FIG. 5 is a broken view of structure, similarly illustrated in FIG. 1, showing a further form of the invention; and FIG. 6 is a broken view of structure, similar to that illustrated in FIG. 1, showing a still further form which the invention may assume.

The visor constructed in accordance with the present invention may be of any shape, the one herein illustrated following somewhat the shape of the visors now being employed for automobile windshields. The visor 11 has spaced side walls 12 and 13, top and bottom walls 14 and 15 and end wall sections 16 and 17 at one end and 18 and 19 at the other end. The supporting rod 21 extends through the wall sections 16 and 19 secured in position by a tube 22 made from the same material as the walls at the time the walls are constructed. The material 23 may also extend over the short projecting end 24 of the rod. The opposite projecting end of the rod 25 is of a length to form a hinge with a supporting bracket in which the end will rotate when the visor 11 is raised or lowered.

One method of forming the visor is that of providing a split mold 27 across which the rod 21 is laid in recesses so as to be accurately positioned therein. A plastisol material 28, well known in the art, is placed in the bottom half of the mold. The mold is then closed, secured in closed position and rotated or otherwise agitated for slushing the material over the rod 21 and the walls of the cavity within the mold 27. The mold is heated while it is being rotated and agitated to the fusing temperature of the plastisol material. Preferably, the rotation occurs in two or more planes so as to distribute the plastisol evenly on the mold cavity walls. After partially cooling, the mold is opened and the finished visor is removed.

The formation of a skin in a mold in this manner is old and well known as well as the plastisols obtainable in the art. The particular process which is employed is not a part of the present invention insofar as the resulting visor structure is concerned. It is to be understood that the plastisol may be formulated to provide any flexibility to the resulting skin or walls produced thereby so that a desirable flexibility to provide safety, will be embodied in the resulting visor. Preferably, the walls 12 and 13 are arched at approximately 20° radius so as to resist inward flexing if a slight differential pressure occurs between the cooled air on the inside of the visor and the air on the outer side thereof. Should the walls be weak due to the thinness or the flexibility of the material, a needle-like puncture may be made through one of the walls to permit the air to equalize.

It will be noted that in the manufacturing process, the plastisol forms a tube 22 around the rod which is sealed at the ends with the end wall sections 16 and 19 thereby binding the air within the visor. This makes it possible to add air to the visor interior if this should be desired, such as through a hypodermic needle, the puncture of which is immediately sealed. The visor thus provided has walls which are spaced from the supporting rod to provide safety in all positions, especially in the raised position where the top wall 14 is vulnerable to the vehicle occupant. The visor so constructed retains its shape and variations may be made in the flexibility of the material and the thickness of the walls to provide the softness desired.

In another form of the invention illustrated in FIG. 5, a tube 29 is substituted for the rod 21 so as to receive the end of a fixed supporting rod 31 on which the tube 29 pivots when the visor 11 is moved upwardly or downwardly. In FIG. 6 a rod 32 is illustrated having a head 33 provided thereon, which is engaged in a slot in a hinge portion of the supporting bracket to prevent the rod from moving endwise therefrom.

It is to be understood that any coloring material may be added to the plastisol and that type of surface may be applied to the walls of the mold cavities so that visors can be provided which match the decor of the automobile either in color or design or both. Complete safety is provided by the visor since the flexible wall thereof is spaced from the supporting rod in all areas except at the end walls through which the rods extend. By coating the rod at the same time the walls are formed, the interior of the visor is completely sealed. The ends of the rods are so supported that the material 23 may flow about one or both ends to cover the surface thereof.

What is claimed is:

1. In a visor, a pair of side walls joined by top and bottom and end walls of flexible material forming a hollow interior, a rod, means for supporting said rod within the visor on the end walls spaced from the top, side and bottom walls, at least one end of the rod extending from an end wall in position to be engaged by a supporting bracket.

2. In a visor, a pair of side walls joined by top and bottom and end walls of flexible material forming a hollow interior, said end walls having outwardly extending tubular portions, a rod supported within the visor in the tubular extensions of the end walls spaced from the top, side and bottom walls, one end of the rod extending from the tubular extensions in position to be engaged by a supporting bracket, the opposite end of the rod extending beyond the tubular extension of the other end wall.

3. In a visor, a pair of side walls joined by top and bottom and end walls of flexible material forming a hollow interior, a rod supported within the visor on the end walls spaced from the top and bottom walls, at least one end of the rod extending from an end wall in position to be engaged by a supporting bracket, the rod having a tube formed thereon of the wall material which is sealed to the material of the end walls and which extends a substantial distance therebeyond.

4. A safety visor having a hollow interior formed by unitary wall structure of thin flexible material having a thin tube of the same material joined to the end walls and spaced from the other walls, and a supporting element for the visor secured within said tube.

5. In a visor of the safety type, side walls spaced by top and bottom and end walls of flexible material in unitary relation to each other forming a hollow interior, a tube spaced from said walls made of the wall material in sealed relation to the end walls and extending beyond the ends thereof, and a supporting element within said tube.

6. In a visor of the safety type, side walls spaced by top and bottom and end walls of flexible material in unitary relation to each other forming a hollow interior, a tube spaced from said side, top and bottom walls made of the wall material in sealed relation to the end walls, and a metal tube within said spaced tube and extending the length thereof for receiving a rod upon which the tube and visor pivots.

7. In a visor of the safety type, side walls spaced by top and bottom and end walls of flexible material in unitary relation to each other forming a hollow interior, a tube spaced from said walls made of the wall material in sealed relation to the end walls, a rod within said tube extending therefrom to form a hinge with a supporting bracket, and a head of greater diameter than the rod on the projecting end thereof for securing the rod against endwise movement within the bracket.

8. In a visor of the safety type having a hollow interior, a thin flexible material forming the side, top and bottom and end walls, and securing means on at least one end wall by which the visor is supported, said supporting means being a rod extending through said hollow interior out of contact with all portions of the walls except the end walls which supports the rod, the material of said walls forming a tube around the rod in sealed relation to the end walls and spaced from the top, side and bottom walls.

References Cited

UNITED STATES PATENTS

| 2,566,523 | 9/1941 | Holland et al. | 296—97.92 |
| 2,944,814 | 1/1960 | Thoeming | 246—311 |
| 3,128,121 | 4/1964 | Greig. | |

FOREIGN PATENTS

| 1,315,503 | 12/1962 | France. |
| 864,091 | 3/1961 | Great Britain. |
| 1,002,461 | 8/1965 | Great Britain. |
| 608,313 | 9/1960 | Italy. |
| Ad. 78,245 | 5/1962 | France. |

OTHER REFERENCES

German printed application, DAS 1,014,858, Happich, (2) 296–97(.58), (1 sht. dwg.–2 pg. spec.).

BENJAMIN HERSH, *Primary Examiner.*

J. A. PEKAR, *Assistant Examiner.*